United States Patent
Kim et al.

(10) Patent No.: US 11,511,309 B2
(45) Date of Patent: Nov. 29, 2022

(54) COATING DIE INCLUDING DOUBLE SLIT, AND ELECTRODE ACTIVE MATERIAL COATING APPARATUS USING SAME

(71) Applicant: LG Chem, Ltd., Seoul (KR)

(72) Inventors: Ki Tae Kim, Daejeon (KR); Do Hyun Lee, Daejeon (KR); Taek Soo Lee, Daejeon (KR); Cheol Woo Kim, Daejeon (KR); Young Joon Jo, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/278,963

(22) PCT Filed: Aug. 31, 2020

(86) PCT No.: PCT/KR2020/011606
§ 371 (c)(1),
(2) Date: Mar. 23, 2021

(87) PCT Pub. No.: WO2021/054645
PCT Pub. Date: Mar. 25, 2021

(65) Prior Publication Data
US 2021/0354166 A1 Nov. 18, 2021

(30) Foreign Application Priority Data
Sep. 19, 2019 (KR) .................. 10-2019-0115337

(51) Int. Cl.
*B05C 5/02* (2006.01)
*B05C 9/06* (2006.01)
(Continued)

(52) U.S. Cl.
CPC ............ *B05C 5/0262* (2013.01); *B05C 5/027* (2013.01); *B05C 9/06* (2013.01); *B05C 11/1044* (2013.01); *B05C 5/0254* (2013.01); *H01M 4/0404* (2013.01)

(58) Field of Classification Search
CPC ........ B05C 5/0262; B05C 5/027; B05C 9/06; B05C 5/0254; B05C 11/1044;
(Continued)

(56) References Cited

U.S. PATENT DOCUMENTS 5,425,967 A 6/1995 Tomaru
5,922,408 A 7/1999 Nakama et al.
(Continued)

FOREIGN PATENT DOCUMENTS

EP 2402091 A1 1/2012
JP H6296917 A 10/1994
(Continued)

OTHER PUBLICATIONS

Extended European Search Report for EP Patent Application No. 20861945.2 dated Dec. 1, 2021, 3 pgs.
(Continued)

*Primary Examiner* — Laura Edwards
(74) *Attorney, Agent, or Firm* — Lerner, David, Littenberg, Krumholz & Mentlik, LLP (57) ABSTRACT

The present invention relates to a double slit coating die, and an electrode active material coating apparatus comprising same, the double slit coating die comprising first to fourth blocks which are positioned sequentially adjacent to each other, and having a structure in which the positions of the first and second blocks can move in a direction tilted at an angle θ with respect to the interface between the second and third blocks. The present invention has the effects of preventing slip surfaces between blocks constituting the die
(Continued)

from spreading apart, and reducing offset in a coating process.

13 Claims, 3 Drawing Sheets (51) Int. Cl.
B05C 11/10 (2006.01)
H01M 4/04 (2006.01)
(58) Field of Classification Search
CPC ............. H01M 4/0404; H01M 4/1391; H01M 4/1397; H01M 4/1393; H01M 4/1395; H01M 10/052; Y02E 60/10
USPC .......................................... 118/300, 411, 412
See application file for complete search history.

(56) References Cited

U.S. PATENT DOCUMENTS

| 7,621,737 | B2 | 11/2009 | Ciliske et al. |
| 8,821,960 | B2 | 9/2014 | Jackson et al. |
| 2008/0213471 | A1* | 9/2008 | Oki ..................... B05C 5/0254 427/420 |
| 2011/0287171 | A1 | 11/2011 | Seo et al. |
| 2018/0117619 | A1 | 5/2018 | Choi et al. |
| 2019/0351446 | A1 | 11/2019 | Lee et al. |

FOREIGN PATENT DOCUMENTS

| JP | H08057389 A | 3/1996 |
| JP | H09276770 A | 10/1997 |
| JP | 2000024569 A | 1/2000 |
| JP | 2001345096 A | 12/2001 |
| JP | 2003112101 A | 4/2003 |
| JP | 2009543721 A | 12/2009 |
| JP | 2011041892 A | 3/2011 |
| JP | 2012006008 A | 1/2012 |
| JP | 2013013856 A | 1/2013 |
| JP | 2020505750 A | 2/2020 |
| KR | 20110128589 A | 11/2011 |
| KR | 20130120895 A | 11/2013 |
| KR | 20160124380 A | 10/2016 |
| KR | 20160144144 A | 12/2016 |
| KR | 20190019827 A | 2/2019 |

OTHER PUBLICATIONS

International Search Report for PCT/KR2020/011606 dated Nov. 30, 2020.

* cited by examiner

COATING DIE INCLUDING DOUBLE SLIT, AND ELECTRODE ACTIVE MATERIAL COATING APPARATUS USING SAME

CROSS-REFERENCE TO RELATED APPLICATIONS

This application is a national phase entry under 35 U.S.C. § 371 of International Application No. PCT/KR2020/011606, filed on Aug. 31, 2020, published in Korean, which claims priority to Korean Patent Application No. 10-2019-0115337, filed on Sep. 19, 2019, the contents of which are hereby incorporated herein by reference in their entireties.

TECHNICAL FIELD

The present invention relates to a coating die including a double slit and an apparatus for coating an electrode active material using the same.

BACKGROUND ART

As technology development and demand for mobile devices have increased, a demand for secondary batteries as an energy source has rapidly increased, and recently, the use of secondary batteries as a power source for electric vehicles (EV) and hybrid electric vehicles (HEV) is being realized. Accordingly, many studies have been conducted on secondary batteries capable of meeting various demands. In particular, there is a high demand for lithium secondary batteries having high energy density, high discharge voltage and output stability.

In particular, since lithium secondary batteries used in electric vehicles should be able to be used for more than 10 years under severe conditions in which charging and discharging by large currents are repeated in a short time, as well as high energy density and characteristics that can exhibit large output in a short time, it is inevitably required to have superior safety and long-term life characteristics than a small lithium secondary battery.

In particular, the electrode of a lithium secondary battery is an important factor determining the long-term life as well as the initial characteristics of the battery, and has been studied from various angles from the active material to the manufacturing process. In order to improve the performance of a secondary battery, the development of an electrode structure in which active material layers having a two-layer structure are formed on a current collector is drawing attention.

However, an electrode active material coating apparatus for forming an active material layer having a two-layer structure includes a first slit nozzle and a second slit nozzle for forming active material layers having a two-layer structure on a current collector. In the conventional electrode active material coating apparatus, there is a problem in that the height of the first slit nozzle and the second slit nozzle cannot be controlled, or gaps between the first slit and the second slit are generated due to the weight of a connection pipe.

DISCLOSURE

Technical Problem

The present invention is invented to solve the above problems, and an object of the present invention is to provide a coating die including a double slit capable of compensating for gaps in the interface between blocks and effectively controlling variables of a coating process, and an electrode active material coating apparatus including the same.

Technical Solution

A coating die including a double slit according to the present invention includes: sequentially neighboring first to fourth blocks; a first slit formed at an interface between the first and second blocks to discharge a first coating liquid; a second slit formed at an interface between the third and fourth blocks to discharge a second coating liquid; and a position control unit for controlling a position by moving the first and second blocks in a direction perpendicular to a ground.

The position control unit includes: a support plate configured to support lower portions of the first and second blocks; and a driving unit configured to contact a lower portion of the support plate and change a position of the support plate in a direction perpendicular to the ground as moving in a direction parallel to the ground, wherein an interface between the lower portion of the support plate and the driving unit is formed at an angle of 5 to 30° with respect to a moving direction of the driving unit.

In one example, the interface between the lower portion of the support plate and the driving unit may preferably be formed at an angle of 5 to 30° with respect to the moving direction of the driving unit.

The position control unit may further include a moving shaft configured to be formed along a moving path of the driving unit and support through the driving unit, and a hand lever connected to the moving shaft to control the movement of the moving shaft.

At this time, the moving shaft and an inside of the driving unit through which the moving shaft passes may be formed with screw threads to be engaged with each other, and by operating the hand lever, the moving shaft may rotate and move the driving unit along a longitudinal direction of the moving shaft.

One or more spherical or cylindrical bearings may be provided at the interface where the lower portion of the support plate and the driving unit are in contact, thereby reducing the friction of the interface.

In another embodiment of the present invention, the coating die may further include an auxiliary position control unit configured to move the first and second blocks in a downward direction perpendicular to the ground.

At this time, the auxiliary position control unit may be located above the first block, and move the first and second blocks by contacting and pressing an outer surface of the first block as the auxiliary position control unit descends in a direction perpendicular to the ground, and by manufacturing the auxiliary position control unit in a shape corresponding to the shape of the outer surface of the first block, it can serve to assist in preventing the first slit and the second slit from spreading.

In one example, the coating die according to the present invention further includes a first coating liquid storage unit configured to be formed between the first and second blocks to supply a first coating liquid to a first slit, and the first coating liquid storage unit has a structure fluidly connected to a coating liquid injection passage passing through the first block.

In one example, the coating die according to the present invention further includes a second coating liquid storage unit configured to be formed between the third and fourth blocks to supply a second coating liquid to a second slit, and the second coating liquid storage unit has a structure fluidly connected to a coating liquid injection passage passing through the fourth block.

In one example, an interface where the second and third blocks are in contact is perpendicular to the ground, and the second and third blocks have a form in which a width of a cross section of the second and third blocks gradually narrows upward. In a specific example, a discharge direction for discharging first and second coating liquids through the first and second slits is directed upward and is directed in a direction that converges toward an extension line of the interface where the second and third blocks contact each other. Further, in response to changes in positions of the first and second blocks by the position control unit, a step difference between the first and second slits is changed.

In one example, the coating die further includes a micro-gauge configured to indicate a position change of the first and second blocks by the position control unit.

Further, the present invention provides an apparatus for coating an electrode active material including the above-described coating die.

In one example, the coating die has a structure in which an electrode active material is discharged through first and second slits on one surface of an electrode current collector and forms a double layer of the electrode active material.

In a specific example, in the coating die, each of the first and second slits discharges an electrode active material upward, the electrode active material is discharged to the lower surface of the electrode current collector through the second slit to form a lower active material layer, and an upper active material layer is sequentially formed on the lower active material layer through the first slit.

Advantageous Effects

A coating die including a double slit and an electrode active material coating apparatus using the same according to the present invention have an effect of preventing a phenomenon in which a gap is generated in a slip surface between blocks constituting a die, and an offset in a coating process is reduced.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In the present invention, "coating liquid" is a generic term for a component that is discharged onto a substrate to form a coating layer, and includes, for example, a slurry state.

The present invention relates to a coating die including a double slit and includes: sequentially neighboring first to fourth blocks; a first slit formed at an interface between the first and second blocks to discharge a first coating liquid; a second slit formed at an interface between the third and fourth blocks to discharge a second coating liquid; and a position control unit for controlling a position by moving the first and second blocks in a direction perpendicular to a ground.

In one example, the position control unit includes: a support plate configured to support lower portions of the first and second blocks; and a driving unit configured to contact a lower portion of the support plate and change a position of the support plate in a direction perpendicular to the ground as moving in a direction parallel to the ground, wherein an interface between the lower portion of the support plate and the driving unit forms a slope with an angle exceeding 0 with respect to the moving direction of the driving unit. The angle is in the range of 5 to 30°, specifically in the range of 10 to 20° or in the range of 10 to 15°.

The double slit coating die according to the present invention has a structure including four blocks, in which a first slit is formed at the interface of the first and second blocks, and a second slit is formed at the interface of the third and fourth blocks. Each of the first and second slits discharges the first and second coating liquids to thereby form a double-layered coating layer on the substrate. For example, the second coating liquid discharged through the second slit forms a lower coating layer on the substrate, and the first coating liquid discharged through the first slit forms an upper coating layer on the lower coating layer. In order to sequentially form the lower and upper coating layers on the substrate, it is necessary to adjust the separation distance or step difference between the first and second slits. To this end, the positions of the first slit are adjusted by controlling the positions of the first and second blocks. In order to adjust the position of the first slit, it is necessary to form a structure in which the second and third blocks are separated into two blocks. However, when the second and third blocks form separate blocks that operate separately, the interface between the second and third blocks is widened due to the weight of the injection pipe connected to the coating die. For example, when the gap between the second and third blocks is widened, the gap between the first and second slits also increases, which acts as a process variable of the double-slot coating die according to the present invention.

In the present invention, when controlling the vertical position of the first and second blocks, as the driving unit in contact with the lower portion of the support plate moves in a direction parallel to the ground, the support plate moves along the inclined interface between the driving unit and the lower portion of the support plate. As such, the force applied to the first and second blocks not only acts in a direction perpendicular to the ground, but also acts in the direction in which the interface between the second block and the third block exists, that is, the inside of the die, and the final force becomes the result of these two forces. At this time, the force acting inside the die can be adjusted according to the angle of the interface between the lower portion of the support plate and the driving unit, and as a result of an experiment by the applicant of the present invention, the angle should be at least 5° to prevent the interface from spreading. Accordingly, it is possible to compensate for the gap between the second and third blocks and to effectively control the parameters of the coating process. In addition, a separation preventing member is formed at one end of the support plate to support while contacting the side surface of the first block, thereby preventing the first block from being pushed laterally and detached.

The angle can be adjusted according to the type, location, and weight of the device additionally mounted on the slot die. However, in the case that the angle exceeds 30°, the force applied in the direction inside the slot die becomes too large, and thus the frictional force at the interface between the second block and the third block may become too large, making position control difficult.

In one embodiment, the position control unit may include: a moving shaft formed along a moving path of the driving unit and supporting through the driving unit; and a hand lever connected to the moving shaft to control the movement of the moving shaft, and the moving shaft and the inside of the driving unit through which the moving shaft passes may be formed with screw threads to engage with each other. In this case, when the moving shaft is rotated by manipulating the hand lever, it is possible to move the driving unit in one direction along the moving shaft while rotating the screw thread engaged with each other. The operation of the hand lever is performed either directly by the operator or by instructions from a programmed computer.

On the other hand, the driving unit raises or lowers the support plate by applying a force to the support plate along the interface in contact with the support plate while moving along the moving shaft. In this case, one or more spherical or cylindrical bearings may be provided at the interface between the driving unit and the support plate in order to reduce the frictional force of the interface and facilitate movement.

In addition, as another embodiment of the present invention, an auxiliary position control unit for moving the first and second blocks in a downward direction perpendicular to the ground may be further included. The position control unit of the present invention serves to control the vertical position of the first and second blocks by raising or lowering the support plate, but when the support plate descends, the only force acting on the first and second blocks is gravity. Therefore, when the interfacial frictional force between the second block and the third block, which is the slip surface, increases according to the process variable, the descending is not smooth only by gravity, and thus position control failure may occur.

The auxiliary position control unit may contact the outer surface of the first block and apply an additional force other than gravity from the top to the bottom while descending, thereby solving a problem of a lower position control failure that may occur due to frictional force of the slip surface. In addition, like the separation preventing member of the support plate, there is also an auxiliary effect of preventing the separation by supporting the upper portion of the first block so as not to be separated to the side surface.

In one embodiment, a first coating liquid storage unit formed between the first and second blocks to supply the first coating liquid to the first slit is provided, and the first coating liquid storage unit is fluidly connected to the coating liquid injection passage passing through the first block. Further, a second coating liquid storage unit formed between the third and fourth blocks to supply a second coating liquid to the second slit, and the second coating liquid storage unit is fluidly connected to the coating liquid injection passage passing through the fourth block.

In one example, the double slit coating die according to the invention consists of four blocks. The interface between the first and second blocks forms a first slit, and the interface between the third and fourth blocks forms a second slit. The first and second blocks have a structure in which height can be adjusted by a position control unit. In this case, the first and fourth blocks are positioned outside the double slit coating die, respectively, and the coating liquid is supplied through the first and fourth blocks, respectively. An injection pipe or the like for supplying a coating liquid is connected to the first and fourth blocks, respectively, and an air vent facility or the like is connected as necessary. These connecting pipes are not only heavy, but also regularly or irregularly apply force to the coating die side by a fastened supply pump or air compressor. In the double slit coating die according to the present invention, a phenomenon, in which the interface between the second and third blocks is widened due to the weight of the injection port pipe or the like, may occur. In the present invention, by controlling the positional movement direction of the first and second blocks, it is possible to compensate for the gap between the second and third blocks and to effectively control the parameters of the coating process.

For example, in the double slit coating die according to the present invention, the interface where the second and third blocks are in contact is formed perpendicular to the ground, and the second and third blocks have a shape in which the width of the cross section gradually decreases in the upward direction. In this case, the double slit coating die according to the present invention is a vertical coating die, and the discharge direction of the coating liquid is the upper direction. When the substrate layer is moved by a conveyor above the double slit coating die, coating is performed on the lower surface of the substrate layer. Specifically, the discharge direction for discharging the first and second coating liquids through the first and second slits is directed upward and is directed in a direction that converges toward the extension line of the interface where the second and third blocks contact each other. A lower coating layer and an upper coating layer are continuously formed on the substrate layer by forming such that the discharge direction for discharging the first and second coating liquid through the first and second slits becomes a direction that converges toward an extension line of the interface where the second and third blocks are in contact.

In another embodiment, in response to changes in the positions of the first and second blocks by the position control unit, the step difference between the first and second slits is changed. When the positions of the first and second blocks are changed by the position control unit, the position of the first slit for discharging the first coating liquid is also changed accordingly. For example, when the positions of the first and second blocks move in the vertical upward direction, the position of the first slit also moves upward. In addition, in the present invention, the "step difference between first and second slits" means a phase difference between the discharge port of the first slit and the discharge port of the second slit. For example, when the double slit coating die according to the present invention is a vertical coating die, the step difference between the first and second slits represents a height difference between the discharge port of the first slit and the discharge port of the second slit. By controlling the step difference between the first and second slits, the thicknesses of the lower and upper coating layers and/or the thickness ratio of each layer, etc. are controlled.

For example, it may further include a micro-gauge indicating the position change of the first and second blocks by the position control unit. Changes in the positions of the first and second blocks are checked through the micro-gauge. The micro-gauge may indicate the positions of the first and second blocks, or may indicate the degree of control of the position control unit as a level difference between the first and second slits. Alternatively, when the support plates supporting the first and second blocks are moved by the operation of the hand lever, the micro-gauge may display the operating level of the hand lever.

In addition, the present invention provides an electrode active material coating apparatus including the double slit coating die described above.

In one embodiment, the double slit coating die has a structure in which an electrode active material is discharged on one surface of an electrode current collector through first and second slits, and a double layer of the electrode active material is formed.

Specifically, in the double slit coating die, each of the first and second slits discharges an electrode active material upward. For example, a lower active material layer is formed by discharging an electrode active material on the lower surface of the electrode current collector through a second slit, and an upper active material layer is sequentially formed on the lower active material layer through the first slit.

The electrode active material is a secondary battery, specifically, an electrode active material of a lithium secondary battery. The electrode active material coating apparatus according to the present invention is an apparatus for coating an electrode active material on a current collector, and through this, an electrode coated with an active material having a two-layer structure is manufactured.

In one example, the electrode means a positive electrode and/or a negative electrode of a lithium secondary battery.

The positive electrode has a structure in which a positive electrode active material layer of a two-layer structure is stacked on a positive electrode current collector. In one example, the positive electrode active material layer includes a positive electrode active material, a conductive material, and a binder polymer, and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), and the lithium-containing transition metal oxide may be coated with a metal or metal oxide such as aluminum (Al). Further, in addition to the lithium-containing transition metal oxide, at least one selected from the group consisting of sulfide, selenide, and halide may be used.

The positive electrode active material may be included in the range of 94.0 to 98.5 wt % in the positive electrode active material layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode active material slurry may be easily attached to and which is not reactive in the voltage range of the electrochemical device can be used. Specifically, non-limiting examples of the current collector for the positive electrode include aluminum, nickel, or a foil manufactured by a combination thereof.

The positive electrode active material layer further includes a conductive material. The conductive material is usually added in an amount of 1 to 30% by weight based on the total weight of the mixture including the positive electrode active material. Such a conductive material is not particularly limited as long as it has conductivity without causing a chemical change in the secondary battery. For example, one or more selected from the group consisting of graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

The negative electrode has a structure in which a negative electrode active material layer of a two-layer structure is stacked on a negative electrode current collector. In one example, the negative electrode active material layer includes a negative electrode active material, a conductive material, and a binder polymer, and if necessary, may further include a negative electrode additive commonly used in the art.

The negative electrode active material may include a carbon material, lithium metal, silicon or tin. When a carbon material is used as the negative electrode active material, both low crystalline carbon and high crystalline carbon may be used. Representative examples of low crystalline carbon include soft carbon and hard carbon are typical. Representative examples of high crystalline carbon include one or more selected from the group consisting of natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

Hereinafter, the present invention will be described in more detail through drawings and examples.

Figure 1:
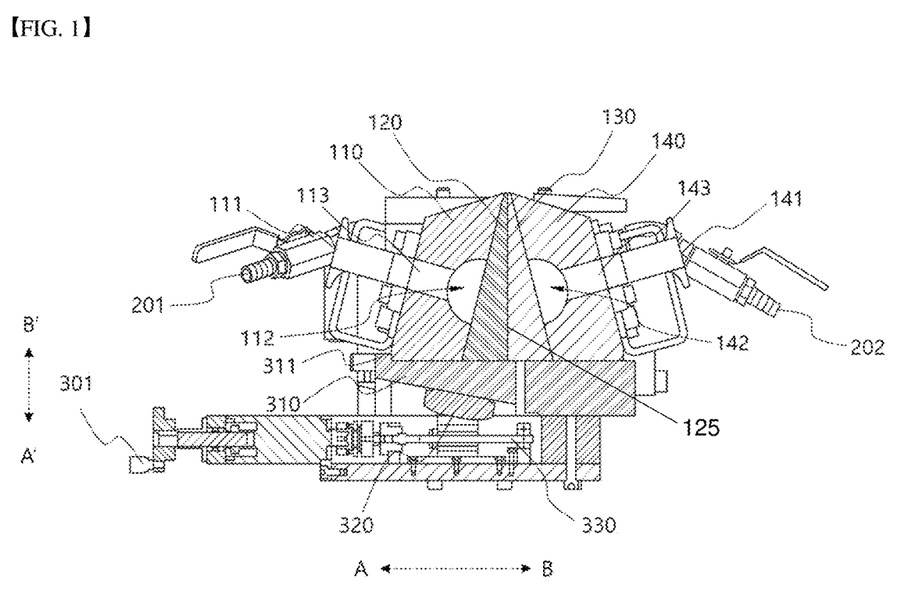
FIG. 1 is a cross-sectional view of an apparatus for coating an electrode active material according to an embodiment of the present invention.

FIG. 1 is a cross-sectional view of an electrode active material coating apparatus according to an embodiment of the present invention. Referring to FIG. 1, a first coating liquid storage unit 112 for supplying a first coating liquid to the first slit is formed between first and second blocks 110 and 120, and the first coating liquid storage unit 112 has a structure fluidly connected to a first coating liquid injection port 111 through a first coating liquid injection passage 113 penetrating a first block 110. In addition, a second coating liquid storage unit 142 is formed between third and fourth blocks 130 and 140 to supply a second coating liquid to a second slit, and the second coating liquid storage unit 142 has a structure fluidly connected to a second coating liquid injection port 141 through a second coating liquid injection passage 143 penetrating a fourth block 140.

A double slit coating die consists of 4 blocks 110, 120, 130 and 140, the interface between the first and second blocks 110 and 120 forms a first slit, and the interface between the third and fourth blocks 130 and 140 forms a second slit. The first and second slits discharge the first and second coating liquids upward. Specifically, the discharge direction for discharging the first and second coating liquids through the first and second slits is directed upward and is directed in a direction that converges toward the extension line of the interface where the second and third blocks 120 and 130 contact each other.

The first coating liquid storage unit 112 for supplying the first coating liquid to the first slit is formed between first and second blocks 110 and 120, and the first coating liquid storage unit 112 has a structure in which the first coating liquid injection passage 113 penetrating through the first block 110 is formed. In addition, the second coating liquid storage unit 142 is formed between the third and fourth blocks 130 and 140 to supply a second coating liquid to the second slit, and the second coating liquid storage unit 142 has a structure in which the second coating liquid injection passage 143 passing through the fourth block 140 is formed.

A support plate 310 supporting the first and second blocks 110 and 120 and a hand lever 301 instructing the movement of the support plate 310 are positioned below the first and second blocks 110 and 120. In addition, a separation preventing member 311 is formed at one end of the support plate 310 to prevent separation of the first block 110 in the lateral direction. When the hand lever 301 is manipulated, the driving unit 320 in contact with the lower surface of the support plate 310 moves, and as the driving unit 320 moves along the lower surface of the support plate 310, the support plate 310 is raised or lowered. The moving shaft 330 passes through the driving unit 320, and a screw thread formed on the surface of the moving unit 330 may be engaged with the screw thread inside the driving unit 320 through which the moving unit 330 passes. When the moving shaft 330 is rotated by the operation of the hand lever 301, the driving unit 320 engaged through the screw thread moves in one direction or the other direction along the moving shaft 330. At this time, as the lower surface of the support plate 310 in contact with the driving unit 320 slides along the interface, the position of the support plate 310 is changed. In FIG. 1, the moving directions of the driving unit are shown as A and B, and the moving directions of the support plate corresponding thereto are shown as A' and B'. For example, when the driving unit moves in the A direction, the support plate moves in the A' direction, that is, the downward direction, and when the driving unit moves in the B direction, the support plate moves in the B' direction, that is, the upward direction.

Figure 2:
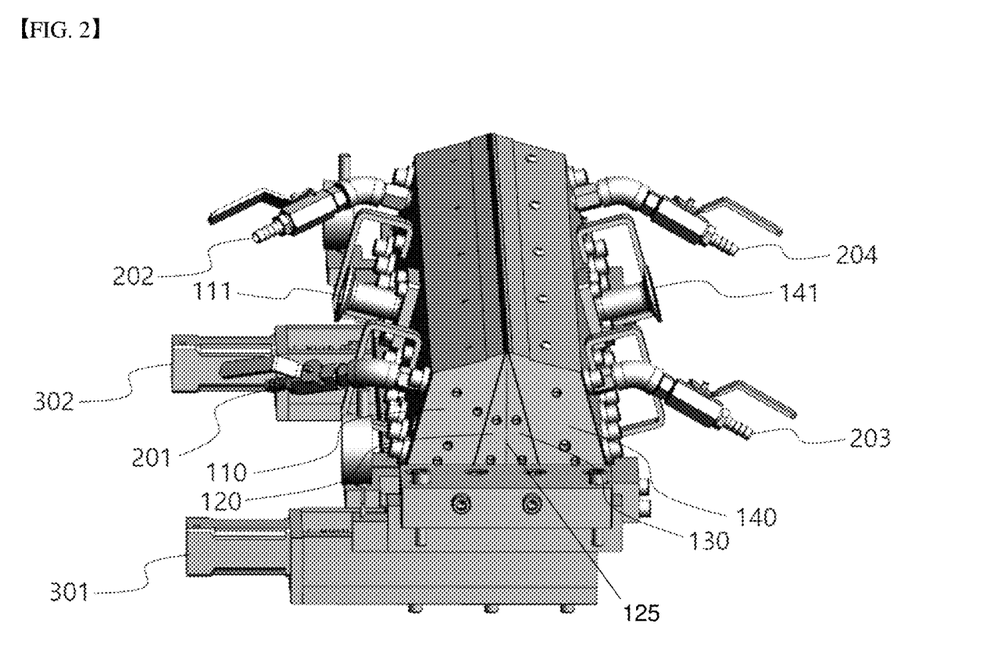
FIG. 2 is a perspective view of an apparatus for coating an electrode active material according to an embodiment of the present invention.

FIG. 2 is a perspective view of an apparatus for coating an electrode active material according to an embodiment of the present invention. Referring to FIG. 2, an electrode active material coating apparatus according to the present invention has a structure including a double slit coating die composed of four blocks 110, 120, 130, and 140. The interface between the first and second blocks 110 and 120 forms a first slit, and the interface between the third and fourth blocks 130 and 140 forms a second slit. The first and second slits discharge the first and second coating liquids upward.

The first and second blocks 110 and 120 have a structure in which position can be adjusted by a position control unit. Position adjustment of the first and second blocks 110 and 120 is performed by manipulation of the hand levers 301 and 302. For example, when the hand levers 301 and 302 are rotated, the positions of the first and second blocks 110 and 120 are adjusted according to the same principle as described above.

The first and fourth blocks 110 and 140 are positioned outside the double slit coating die, respectively, and the coating liquid is supplied through the first and fourth blocks 110 and 140, respectively. The first and fourth blocks 110 and 140 are connected to first and second coating liquid injection ports 111 and 141 respectively supplying the coating liquid, and air vents 201, 202, 203, 204, etc., as necessary, are also connected.

There may be a spreading phenomenon due to the load of the equipment connected to the coating die. It is possible to reduce the load applied to the equipment by installing a support under the equipment, but in this case, it is difficult to secure a working space. In addition, when changing to a different type of coating die, there is an inconvenience in the process of removing all the supports and then redesigning and installing a support suitable for a new type of coating die. In the present invention, it is possible to control the step difference of the double slit coating die in real time while preventing the spreading phenomenon without such an additional support.

Figure 3:
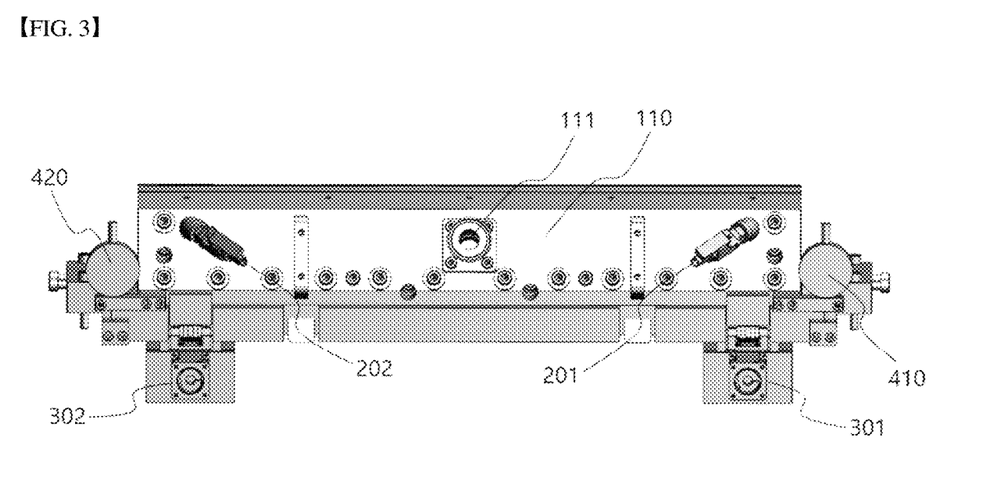
FIG. 3 is a front view of an apparatus for coating an electrode active material according to an embodiment of the present invention.

FIG. 3 is a front view of an apparatus for coating an electrode active material according to an embodiment of the present invention. Referring to FIG. 3, the first coating liquid injection port 111 is fluidly connected to the first block 110. The positions of the first and second blocks 110 and 120 are adjusted by the manipulation of the hand levers 301 and 302, and micro-gauges 410 and 420 indicating a change in the position of the first and second blocks 110 and 120 are formed. In addition, air vents 201 and 202 are connected to both sides of the first block 110 as necessary.

Figure 4:
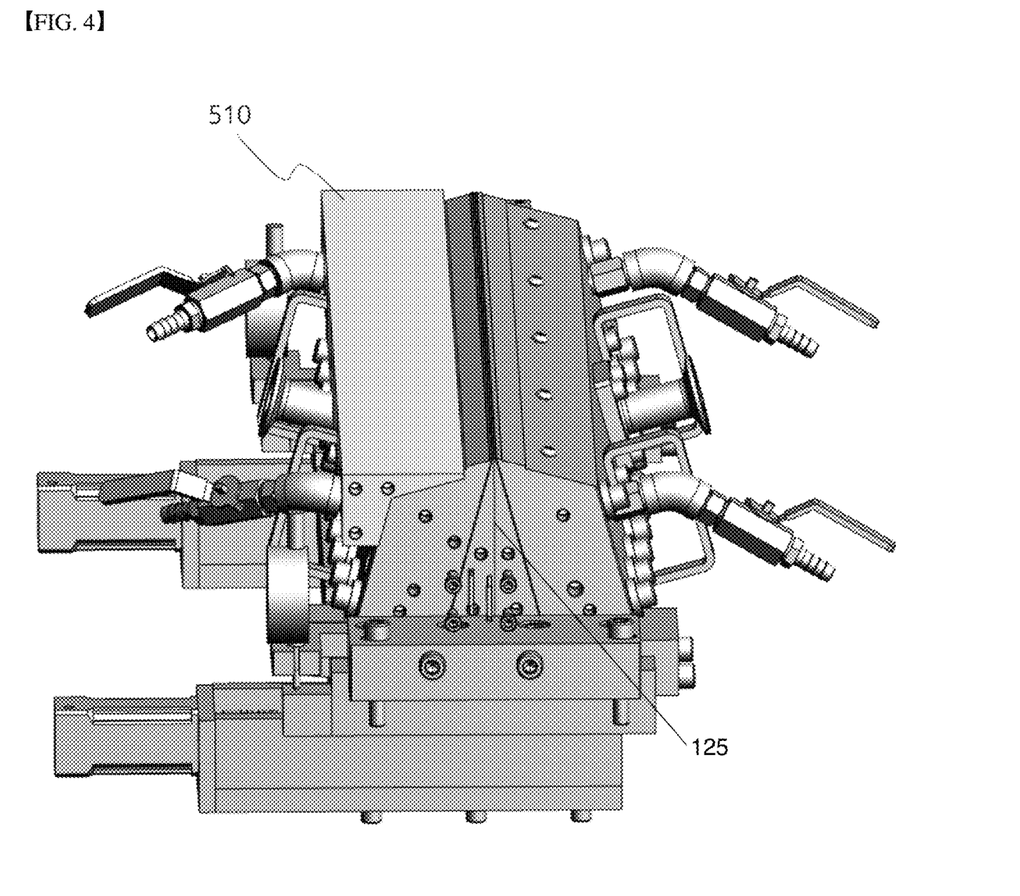
FIG. 4 is a perspective view of an apparatus for coating an electrode active material according to another embodiment of the present invention.

FIG. 4 shows another embodiment of the present invention, which further includes an auxiliary position control unit 510 on the upper portion of the first block 110. The auxiliary position control unit 510 has a shape corresponding to the outer surface of the first block, and as the auxiliary position control unit 510 descends, it is possible to apply pressure to the first block 110 and the second block 120 in a downward direction. Accordingly, it is possible to solve a problem of poor position control that may occur when a large frictional force acts on the slip surface, which is an interface 125 between the second block 120 and the third block 130. In addition, by partially supporting the side surface of the first block 110, there is also an auxiliary effect of preventing generation of a gap.

In the above, the present invention has been described in more detail through the drawings and examples. Accordingly, the embodiments described in the specification and the configurations described in the drawings are only the most preferred embodiments of the present invention, and do not represent all of the technical ideas of the present invention.

It is to be understood that there may be various equivalents and variations in place of them at the time of filing the present application.

DESCRIPTION OF REFERENCE NUMERALS

110: first block
111: first coating liquid injection port
112: first coating liquid storage unit
113: first coating liquid injection passage
120: second block
130: third block
140: fourth block
141: second coating liquid injection port
142: second coating liquid storage unit
143: second coating liquid injection passage
201, 202, 203, 204: air vent
301, 302: hand lever
310: support plate
311: separation preventing member
320: driving unit
330: moving shaft
410, 420: micro-gauge
510: auxiliary position control unit

The invention claimed is:

1. A coating die including a double slit, the coating die comprising:
sequentially neighboring first to fourth blocks;
a first slit formed at an interface between the first and second blocks, the first slit being configured to discharge a first coating liquid;
a second slit formed at an interface between the third and fourth blocks, the second slit being configured to discharge a second coating liquid; and
a position control unit configured to control positions of the first and second blocks by moving the first and second blocks in a direction parallel to an interface between the second and third blocks,
wherein the position control unit comprises:
a support plate that supports lower portions of the first and second blocks; and
a driving unit that contacts a lower portion of the support plate, the driving unit being configured to change a position of the support plate in a direction parallel to the interface between the second and third blocks by moving in a direction perpendicular to the interface between the second and third blocks, and
wherein an interface between the lower portion of the support plate and the driving unit extends at an angle of 5 to 30° with respect to a moving direction of the driving unit.

2. The coating die of claim 1, wherein the position control unit comprises:
a moving shaft formed along a moving path of the driving unit and supported by the driving unit; and
a hand lever connected to the moving shaft, the hand lever being configured to control the movement of the moving shaft.

3. The coating die of claim 2, wherein the moving shaft and an inside of the driving unit through which the moving shaft passes are formed with complimentary screw threads that are engaged with each other, and
wherein when the hand lever operates, the moving shaft rotates and moves the driving unit along a longitudinal direction of the moving shaft.

4. The coating die of claim 1, wherein one or more spherical or cylindrical bearings are provided at the interface where the lower portion of the support plate and the driving unit are in contact.

5. The coating die of claim 1, further comprising:
an auxiliary position controller configured to move the first and second blocks in a downward direction parallel to the interface between the second and third blocks,
wherein the auxiliary position controller is located above the first block, and the auxiliary position controller is configured to move the first and second blocks by contacting and pressing an outer surface of the first block as the auxiliary position controller descends in a direction parallel to the interface between the second and third blocks.

6. The coating die of claim 1, further comprising:
a first coating liquid storage unit formed between the first and second blocks, the first coating liquid storage unit being configured to supply a first coating liquid to a first slit,
wherein the first coating liquid storage unit is fluidly connected to a coating liquid injection passage passing through the first block.

7. The coating die of claim 1, further comprising:
a second coating liquid storage unit formed between the third and fourth blocks, the second coating liquid storage unit being configured to supply a second coating liquid to a second slit,
wherein the second coating liquid storage unit is fluidly connected to a coating liquid injection passage passing through the fourth block.

8. The coating die of claim 1, wherein the interface between the second and third blocks is perpendicular to a ground in a gravitational frame of reference, and the second and third blocks have a form in which a width of a cross section of the second and third blocks gradually narrows upward.

9. The coating die of claim 8, wherein the coating die is configured to discharge the first and second coating liquids through the first and second slits in a direction that converges toward an extension line of the interface between the second and third blocks.

10. The coating die of claim 1, wherein the position control unit is configured to change the positions of the first and second blocks to change; a step difference between the first and second slits.

11. The coating die of claim 1, further comprising a micro-gauge configured to indicate a position change of the first and second blocks caused by the position control unit.

12. An apparatus for coating an electrode active material including the coating die according to claim 1.

13. The apparatus of claim 12, wherein the coating die has a structure in which the electrode active material is configured to be discharged through the first and second slits onto one surface of an electrode current collector to form a double layer of the electrode active material.

* * * * *